US009202444B2

(12) United States Patent
Jackson (10) Patent No.: US 9,202,444 B2
(45) Date of Patent: Dec. 1, 2015

(54) GENERATING TRANSLATED DISPLAY IMAGE BASED ON ROTATION OF A DISPLAY DEVICE

(75) Inventor: Adam Jackson, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 851 days.

(21) Appl. No.: 11/948,749

(22) Filed: Nov. 30, 2007

(65) Prior Publication Data

US 2009/0141045 A1 Jun. 4, 2009

(51) Int. Cl.
*G09G 5/00* (2006.01)
*G09G 5/391* (2006.01)
*G06F 3/14* (2006.01)

(52) U.S. Cl.
CPC ............ *G09G 5/391* (2013.01); *G06F 3/14* (2013.01); *G09G 2340/0492* (2013.01); *G09G 2370/04* (2013.01)

(58) Field of Classification Search
None
See application file for complete search history.

(56) References Cited

U.S. PATENT DOCUMENTS

| | | | | |
|---|---|---|---|---|
| 4,271,476 A * | 6/1981 | Lotspiech | ..................... | 382/235 |
| 5,133,076 A * | 7/1992 | Hawkins et al. | ............. | 708/141 |
| 5,966,116 A * | 10/1999 | Wakeland | ..................... | 345/658 |
| 7,307,635 B1 * | 12/2007 | Yang et al. | ..................... | 345/560 |
| 8,233,003 B2 * | 7/2012 | Obinata | ........................ | 345/555 |
| 2004/0201595 A1 * | 10/2004 | Manchester | .................. | 345/649 |
| 2004/0239690 A1 * | 12/2004 | Wyatt et al. | ..................... | 345/649 |
| 2005/0249435 A1 * | 11/2005 | Rai et al. | ....................... | 382/296 |
| 2006/0012716 A1 * | 1/2006 | Choi | ............................ | 348/588 |
| 2007/0139445 A1 * | 6/2007 | Khan et al. | .................... | 345/649 |
| 2007/0237412 A1 * | 10/2007 | Mizuno | ........................ | 382/240 |
| 2010/0110230 A1 * | 5/2010 | Lim | ........................ | 348/231.99 |

* cited by examiner

*Primary Examiner* — David H Chu
(74) *Attorney, Agent, or Firm* — Lowenstein Sandler LLP (57) ABSTRACT

Embodiments relate to systems and methods for generating address information to translate the order in which memory locations are accessed in a video buffer, to maintain a desired orientation in a rotated display. A video buffer is filled with display data to drive a CRT, LCD, or other display screen, starting with the upper-left corner. When the user rotates the display screen, the display screen continues to scan from the same starting corner, resulting in a misaligned orientation. In embodiments, a correct orientation can be automatically generated by determining a scan direction for the rotated display. The physical location of the new logical starting pixel is determined, and the rows and columns of the display image are rendered in a revised logical order which compensates for the amount and direction of rotation.

22 Claims, 8 Drawing Sheets

GENERATING TRANSLATED DISPLAY IMAGE BASED ON ROTATION OF A DISPLAY DEVICE

FIELD

The present invention relates to the generation of display images, and more particularly to generating a display image that remains in a desired orientation after a user has rotated a monitor or other display device.

BACKGROUND OF RELATED ART

Applications and other software generally send data to a display screen, such as a liquid crystal display (LCD) or cathode ray tube (CRT) display, to generate a display image in a default or normal orientation. The display image can for example be a document, digital image or object. In many cases, the default display orientation for the display image is set to a landscape mode, in which more screen pixels are displayed horizontally than vertically. This is because many display screens are manufactured to have a screen area that is physically wider than it is tall. The computer or other device connected to the display device generally drives the display device with a video subsystem or card including a video display memory or buffer. An application or other software can send display data to the buffer to be read out by display circuitry, to generate video signals to illuminate the pixels of the display device.

The display device is configured to receive and display the pixels in a predetermined scan order, which in the case of a computer monitor such as an LCD or CRT screen begins with the upper left corner. The display device proceeds in a predetermined scan order or direction across the screen from left to right, and then retraces to the first pixel of the next row down. When the last (bottom right) pixel of the display screen is reached, the display returns to the initial (upper left) pixel location and repeats the left-to-right and top-to-bottom scan. In general, the parameters of display height (in pixels), width (in pixels), and pixel-to-pixel dot pitch (or separation) of the physical display device characterize the display area of a typical display screen.

In terms of the interplay between the software driving the display image, the video buffer memory, and the display device, in general the application or other software sends the display data to the buffer in a configuration corresponding to the intended display mode. That is, the application or other software loads the display data to the buffer in an order corresponding to the orientation of the currently selected display mode. For example, a word processing program operating in landscape mode sends display data representing the text to be displayed in the same order that the textual characters will be encountered in the usual left-to-right, top-to-bottom order when scanned by the display device, to generate a display image of correct width, height, and orientation. If the user selects an option in the application to change the display orientation to a portrait mode, the application can update the height, width, and pitch parameters to cause the display screen to display the display image in the selected new orientation. Operating systems, applications, graphics subsystems, and computer monitors today are all capable of generating display images in a variety of formats, orientations, and resolutions.

Even with the availability of modern monitors and mature device drivers, however, difficulties in rendering display images can occur. Many display devices are equipped, for example, with a mechanical swivel or pivot that allows a user to physically rotate the display device. Modern operating systems can detect the physical rotation of a display device, for instance using an internal gyroscope, switch, or other detector. Applications and other software can be configured to receive a notification of a display device rotation, and can adjust the order of, or parameters for, the display data loaded into the video buffer memory to compensate for the changed orientation.

The display device itself, however, continues to physically scan the screen pixels in the same direction and order for which the device is hardwired. This causes the starting corner to be displayed in a different location (e.g., the top left corner becomes the top right corner when the display device is rotated 90 degrees clockwise). This results in the word processing document, digital photograph, or other display image being displayed sideways.

It is possible to use a 3D accelerator chip or other display hardware to perform a "blit" operation to read the display data out of video buffer memory, re-order the display data to correspond to the rotated orientation, and store a second copy of the display data to drive the display device in the rotated position. Performing this correction in hardware, however, involves disadvantages. Those drawbacks include a drain on video memory bandwidth, and a need to store twice as much display data per screen. It may be desirable to provide methods and systems that automatically sense and correct for physically rotated display screens, while maintaining proper orientation of the display image.

DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF EMBODIMENTS

Embodiments of the present invention relate to systems and methods for automatically generating a non-memory intensive translation between data stored in a video buffer memory and the display image rendered on a physically rotated display device. More particularly, a software application can write display data representing an image to be displayed along with display parameters to video buffer memory corresponding to an initial or current display mode. Output display circuitry can access the video buffer memory to extract the display data to drive the pixels of the display device. An address generator can feed addresses to the output display circuitry to access the display data in video buffer memory in a desired order. An operating system, an application, or other software, hardware, or logic can be configured to detect or be notified when the user rotates the display device.

The detection of the physical rotation can trigger the operating system, application, or other software to change the display mode or orientation. For example, the display mode can be changed from landscape mode to portrait mode. In conjunction with that change in display mode, a translation between the native scan pattern of the display device and a logical scan order corresponding to the projected new orientation can be automatically generated. Once the new logical scan order is determined, the address generator can generate addresses in a revised order to access the display data for individual pixels corresponding to the logical scan order. The logical scan order and video buffer addressing can be further dynamically changed if the user rotates the display device again.

More particularly, when a display device is physically rotated, e.g., 90 degrees clockwise, the starting point for the scan pattern as seen by the user shifts from the conventional top left corner of the display device to the top right corner, so that the display image appears sideways. The native scan pattern of the display device then effectively becomes top-to-bottom for each scan line, and the scan lines proceed from right to left. To correct these difficulties, a rotating address generator module can be configured to generate the sequence of addresses to retrieve the display data from the video buffer memory in an order that corresponds to a logical scan pattern of the rotated display device to render the display image in the desired orientation.

An operating system, software application, hardware module, or logic can be configured to detect or be notified when the user rotates the display device. The rotation event can trigger the operating system or software application to change the display mode (e.g. from landscape mode to portrait mode). Subsequently, the software then generates display data to store in the video buffer memory in the projected or intended display mode, including a logical initial pixel location or scan point.

The rotating address generator can be configured to determine the logical initial pixel location after rotation, relative to the native scan pattern of the display device. Depending on the location of the logical initial pixel position, the rotating address generator module can generate a sequence of read addresses from the video buffer memory that create a logical mapping between the logical pixel positions and the native (physical) pixel scan positions on the display device. For example, for a rotation of 90 degree clockwise, the logical initial pixel of the scan pattern is (H−1, 0) from the point of view of the native scan position on the display device. The logical pixel locations in the horizontal direction for the prospective image then proceed to native position (H−2, 0) and continue to decrement by one to native position (0, 0). The next line then increments the W coordinate by one, starting at native (H−1, 1) and proceeds to decrement the H value to native (0, 1).

Accordingly, for a 90 degrees clockwise rotation, the rotating address generator generates a sequence of address values based on the algorithm/heuristic of W loops in the rotated perspective, each loop corresponding to one horizontal scan line. In each loop, a total of H addresses are calculated, starting from (H−1) and decrementing to (0) (end of the scan line in each W loop). When H reaches a value of 0 each time, addresses for the next line (i.e., the next logical horizontal scan row) are calculated again.

Reference will now be made in detail to exemplary embodiments of the invention, which are illustrated in the accompanying drawings. Where possible the same reference numbers will be used throughout the drawings to refer to the same or like parts.

Figure 1:
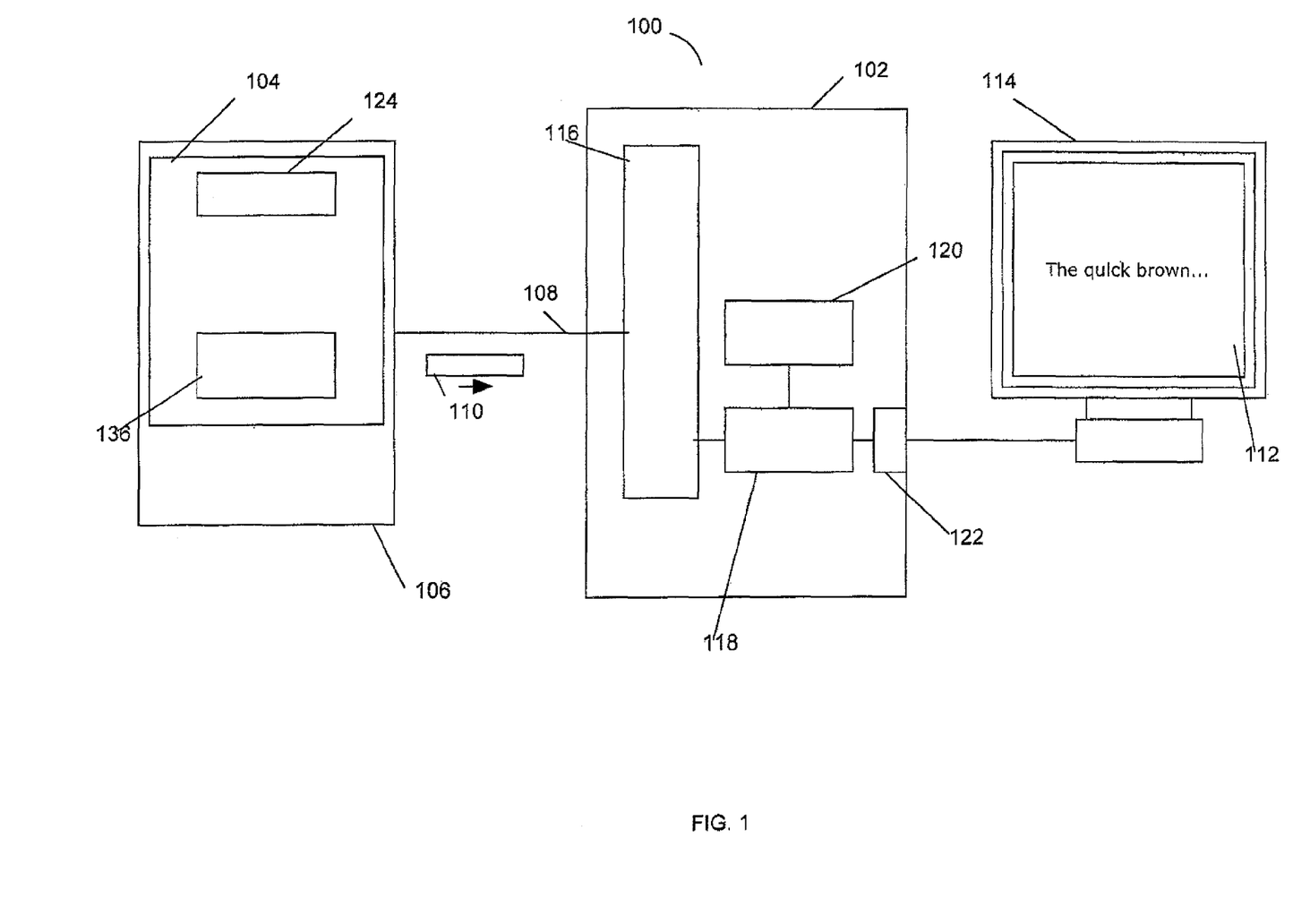
FIG. 1 illustrates an overall system for generating image translation compensating for display rotation, according to various embodiments.

FIG. 1 illustrates a system 100 that is consistent with various embodiments. The system can comprise a display system 102 that incorporates various hardware and software components that cooperate to drive the display image on a display device 114. Display system 102 communicates with a computer or other host 106 over a bus 108, such as a PCIe (peripheral component interface express), AGP (accelerated graphics port), or other bus, interface, or connection. The host 106 can send display data 110 to the display system 102 to render a desired display image 112 on a display device 114, for example via one or more application 124, such as a word processing application, a digital image photo manipulation program, a video program, or other application, utility, program, or other software.

The display data 110 can comprise or include, for example, 24-bit or 32-bit RGB or other pixel color data, alpha channel data, or other data related to or encoding image attributes for an image to be displayed. The display image 112 can comprise or include, for example, the image of a text document, a Web page, a digital photograph or other image, video images or frames, or other images or representations.

The display device 114 can comprise or include, for example, a computer monitor or display screen such as a LCD, plasma, or CRT monitor, a high-definition (HD) television display, or an embedded LCD or other display on a portable music or other media player. Display system 102 can comprise or include video buffer memory 116 that communicates with display circuitry 118. Video buffer memory 116 can receive and store display data 110 received from host 106, for example in video random-access memory (VRAM) or other electronic or other memory, for instance in a linear, sequential, or other format. In embodiments, video buffer memory 116 can be embedded in a video display card, integrated in a motherboard video controller, or configured in other locations of system 100. Display circuitry 118 can be connected to display device 114 through display connector 122. Display connector 122 can comprise or include a physical connector, electrical signaling, and/or logic to communicate display data 110 to display device 114 in an order, format, and signaling scheme compatible with display device 114. Display connector 122 can be or include, for example, a DVI (digital visual interface) connection, an HDMI (high-definition multimedia interface) connection, a VGA (video graphics array) connection, an S-Video connection, or other port, connection, or interfaces Display image 112 so rendered can be characterized by parameters including at least a width W (in pixels), a height H (in pixels), and dot pitch between centers of individual pixels (in millimeters or other units). In some embodiments, the height and width values of a display image can be, for example, 800×600, 1024×768, 1280×1024, 1600×1200, 1920×1200, or other values or display sizes.

Display circuitry 118 can comprise or include a digital to analog converter (DAC), programmable logic, local cache or other storage, and other circuitry to access and decode the display data 110 in video buffer memory 116, and generate electrical signaling to cause display device 114 to display the display image 112. Display circuitry 118 is connected to a rotating address generator 120. Rotating address generator 120 generates addresses into video buffer memory 116 to access display data 110 from a current specified memory location 128 in video buffer memory 116, to drive individual pixels of display circuitry 118. Video buffer memory 116 can store one display frame, or multiple display frames.

Figure 2:
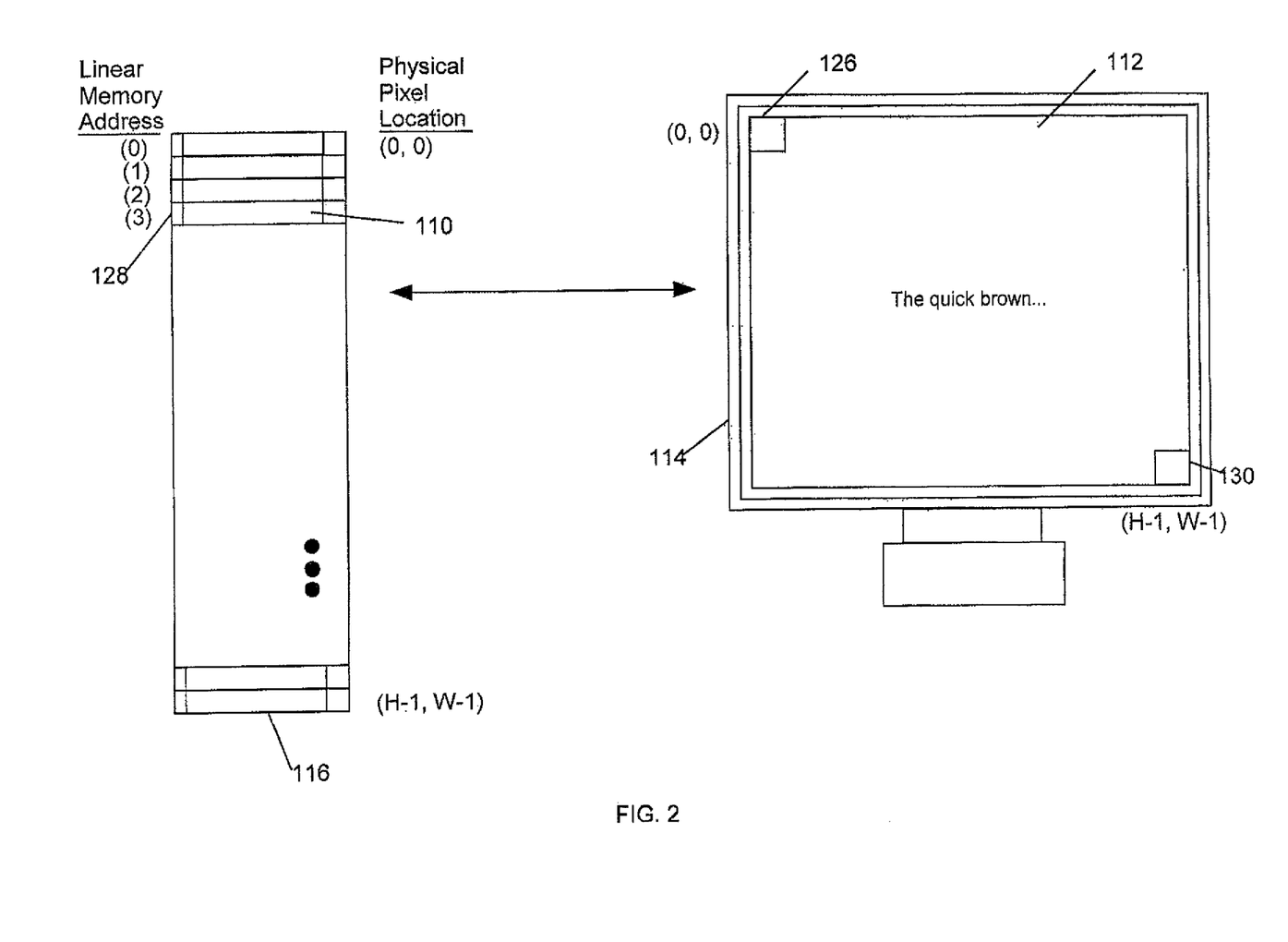
FIG. 2 illustrates aspects of video memory access and display orientation, according to various embodiments.

In general, the display image 112 is presented on display device 114 by sending an initial pixel location 126, illustratively and conventionally the top left-hand corner pixel, to the display device 114 via display connector 122. As shown in FIG. 2, in embodiments the pixel location on display device 114 of initial pixel location 126 can be represented as (0, 0), meaning in the first horizontal row, in the first vertical column presented on display device 114. In embodiments the memory location 128 corresponding to initial pixel location 126 can be address 0. The color, brightness, saturation, alpha channel values, or other characteristics encoded in the display data 110 located at the memory location 128 of video buffer memory 116 corresponding to initial pixel 126 are retrieved and rendered by display circuitry 118 on display device 114. Rotating address generator 120 then increments memory location 128 to the memory location of the next pixel to be displayed. In embodiments, under default, initial, or native display conditions, the next pixel to be displayed can be the next horizontal pixel in the current row, or pixel location (0, 1). The next pixel location to be displayed is then (0, 2), and continues to (0, W−1). The display device 114 then retraces to the next horizontal row, and then displays pixel location (1, 0) followed by (1, 1) to (1, W−1), in raster fashion.

This scanning or reading process continues to the last pixel location 130, represented by native (H−1, W−1). As display device 114 scans across and down its display area, the rotating address generator 120 follows or "walks" the current memory location 128 through locations of video buffer memory 116 in a sequence corresponding to, and in synchronization with, the pixels being illuminated on display device 114. In embodiments, although the display image 112 can be represented in terms of pixel locations along horizontal and vertical (X-Y) axes, the display data 110 can be stored in video buffer memory 116 in linear order from location (0) to location (W*H−1). Other memory storage configurations are possible. In embodiments, for example, the memory location of the next scan line or other increment can be rounded up to a power of 2, for convenience of calculation. Once last pixel location 130 is reached, scanning retraces to initial pixel location 126 for a newly displayed display image 112. Display image 112 can therefore be refreshed at a desired frame rate, for example, at 50 or 60 times a second, or at greater or lesser frequencies.

Figure 3A:
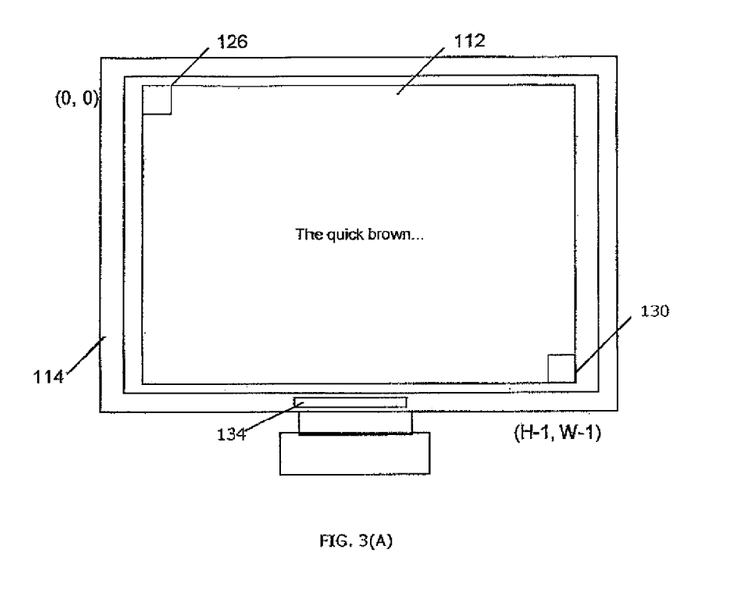
FIGS. 3(A) through 3(D) illustrate aspects of logical repositioning of displayed pixels compensating for display rotation, according to various embodiments.
Figure 3B:
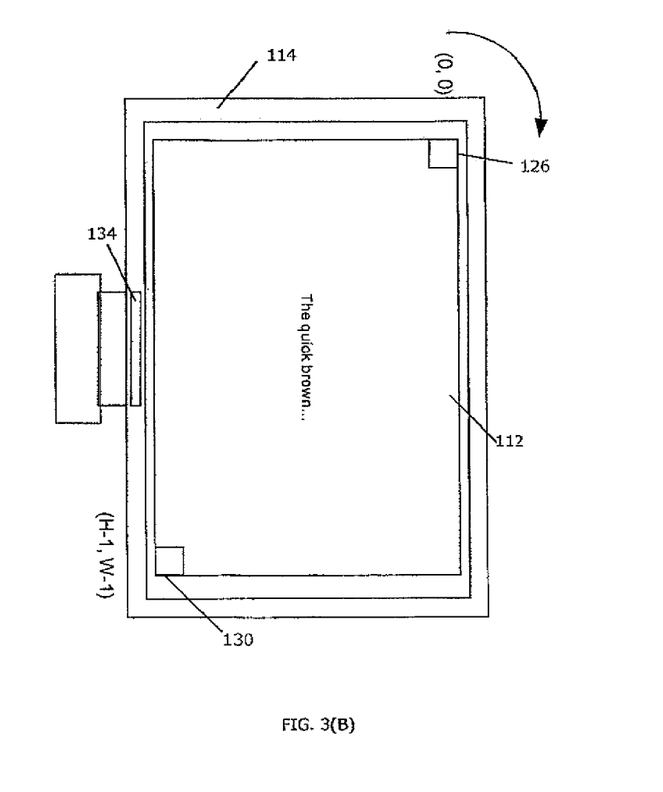

In embodiments such as those generally illustrated in FIGS. 3(A)-(D), a user can rotate display device 114, for instance to rotate the display device 114 through 90 degrees clockwise, as shown in FIG. 3(B). In embodiments, display device 114 can sense or detect the change in physical orientation or position of display device 114 via detector 134 which can comprise or include, for example, an internal gyroscope, a switch, an optical sensor, or other sensor or detector. The detected change of orientation can be transmitted to an operating system 104 of host 106. Operating system 104 can include, among other resources, a window manager 136 for managing the display of windows and other display components, for example including a GUI (graphical user interface) desktop, applications, pop-ups, color selections, borders, and other display functions.

Figure 3C:
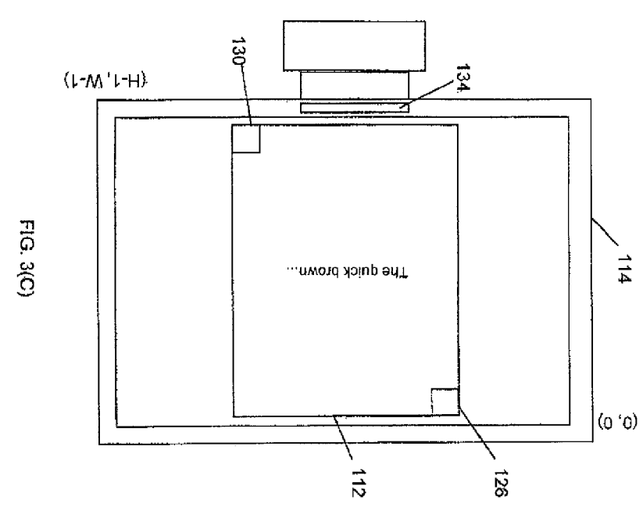

Operating system 104 can notify a window manager 136 or other logic or software that a change in the orientation of display device 114 has occurred. Window manager 136 can respond to the notification of a changed in orientation of display device 114 by adjusting or updating the display mode being used to deliver display image 112. For example, window manager 136 or other software can change the display mode from landscape mode to portrait mode in response to a rotation of 90 or 270 degrees, for instance as shown in FIG. 3(C). Window manager 136 or other software can choose to maintain a current display mode upon notification of a change in orientation of display device 114. The sensing of the orientation or position of display device 114 by window manager 136 and related resources, and subsequent changes in display modes or orientations, can take place transparently to application 124.

After window manager 136 or other software performs any update to the display mode used to present display image 112, as shown in FIG. 3(C) after rotation of display device 114 by 90 degrees an incorrect, skewed or misaligned orientation of the display image 112 results. This is due in one regard to the hardwired nature of the scan pattern performed by display device 114, which always begins in initial pixel location 126, and proceeds to scan first horizontally and then retraces to a new position vertically (relative to the physical device display area itself), regardless of the physical orientation of display device 114. Native pixel locations are described herein with respect to the intrinsic or physical row-column (x and y-axis) of display device 114, beginning with the upper-left corner pixel whose physical location is designated as (0, 0), viewed in the frame of reference of display device 114 without regard to rotation. According to embodiments of the invention, the skewed presentation that results from rotation of display device 114 can be avoided and an upright orientation of display image 112 can, however, be automatically maintained after rotation of display device 114. For the example shown in FIG. 3(D), a user can rotate display device 114, and a logical mapping between pixel locations as they are physically displayed on display device 114 and the desired upright or correct representation of display image 112 can be automatically generated.

After operating system 104 detects the rotation of display device 114, operating system 104 or other software, hardware, or logic can initiate a logical re-ordering of the pixels to be displayed on display device 114. As likewise shown in FIG. 3(D), window manager 136 and/or operating system 104 or other software, hardware, or logic can determine a logical initial pixel location 132, based on the amount and direction of rotation detected in display device 114, illustratively 90 degrees in a clockwise direction. In other embodiments, rotation by other integer multiples of 90 degrees in either direction can be detected and compensated for. It will be appreciated that in embodiments, rotation by other amounts or directions can also be detected and compensated for. The rotation which is detected and compensated for need not be an integer multiple of 90 degrees but can be any number of degrees of rotation.

Figure 3D:
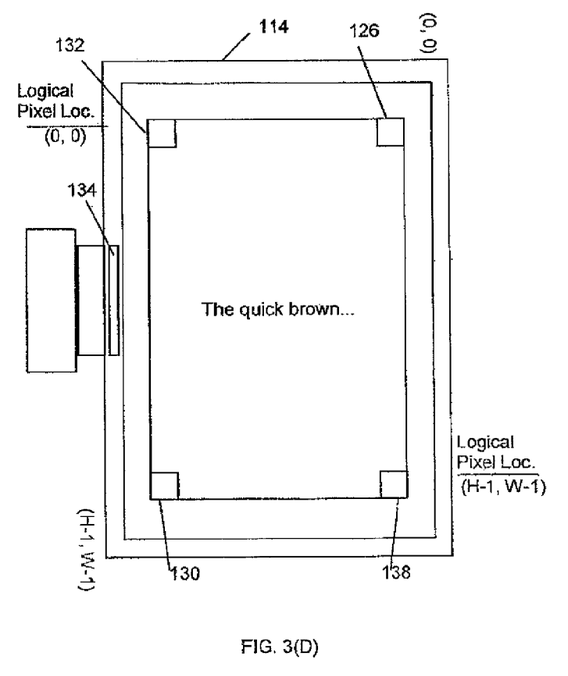

Window manager 136 and/or operating system 104 or other software, hardware, or logic can, in the case of rotation by 90 degrees clockwise, translate or map the initial pixel location 126 to logical initial pixel location 132 by exchanging rows and columns of the two (physical and logical) initial pixel locations. That is, logical initial pixel location 132 can be determined by translating the native (0, 0) initial pixel location 126 to a logical pixel initial location 130 (0, 0), corresponding to native pixel position (H−1, 0), after rotation. The next logical pixel location can be determined by translating the next native pixel location (0, 1) to a next logical pixel initial location (0, 1) which corresponds to native pixel display location (H−2, 0) after rotation, and so on. The scan line ends with logical last pixel location 138 at logical position (0, W−1) (end of first row) translating, corresponding, or mapping to native pixel location (0, 0).

After the first logical pixel row is illuminated on display screen 114, the logical scan order can proceed to be translated to the second logical row (1, 0), (1, 1), (1, 2) . . . (1, W−1) whose pixels correspond to the native pixel locations (H−1, 1), (H−2, 1), (H−3, 1) . . . (0, 1). After the second logical pixel row is illuminated on display screen 114, the logical scan order can proceed to the third, logical row (2, 0), (2, 1), (2, 2) . . . (2, W−1) whose pixels correspond to the native pixel locations (H−1, 2), (H−2, 2), (H−3, 2) . . . (0, 2). The logical scan order of the final logical row (H−1, 0), (H−1, 1), (H−2, 2) . . . (2, W−1) can be generated whose pixels correspond to the native pixel locations (H−1, W−1), (H−2, W−1), (H−3, W−1) . . . (0, W−1).

Figure 4A:
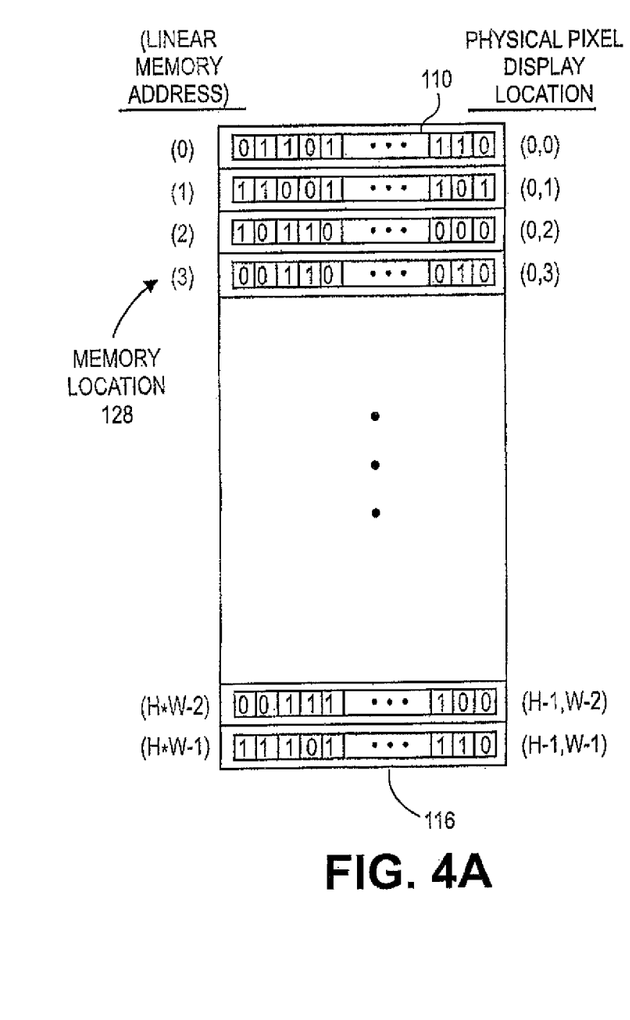
FIGS. 4(A) and 4(B) illustrate aspects of memory address translation or mapping to generate pixel display in a revised logical order compensating for display rotation, according to various embodiments.

In embodiments, and as generally shown in FIG. 4(A), window manager 136, operating system 104, or other logic, software, or hardware can dynamically determine a revised or adjusted read-out order of the display data 110 located in video buffer memory 116, to ensure that the display data 110 for a logical pixel corresponds to desired display values. The addresses of the memory accesses can be re-ordered by rotating address generator 120 itself or by rotating address generator 120 in conjunction with windows manager 136, operating system 104, and/or other hardware or software.

Figure 4B:
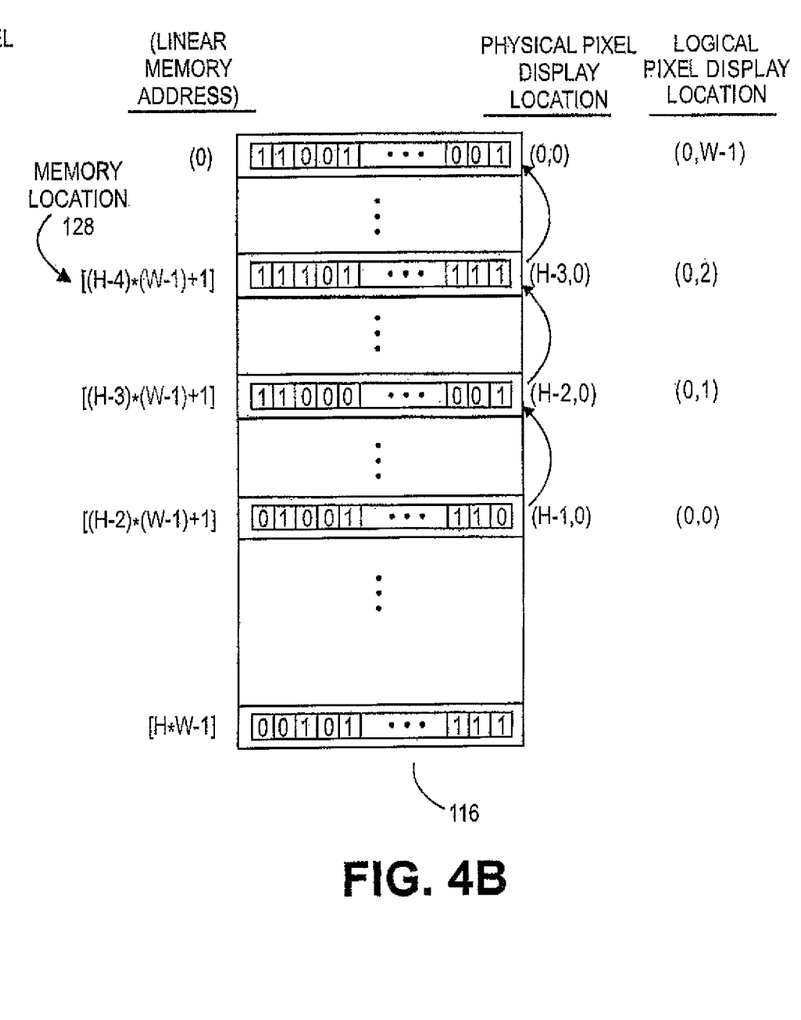

In embodiments, and as generally shown in FIG. 4(B), the address in video buffer memory 116 for logical initial pixel location 132 is translated from its original memory location 128 at the linear address of (0), to a linear address of the quantity [(H−2)*(W−1)+1], corresponding to native pixel location (H−1, 0). The address in video buffer memory 116 for the next logical pixel location in the first logical row is translated from its original, linear or sequential address of (1), corresponding to native pixel location (H−2, 0), to a linear address of the quantity [(H−3)*(W−1)+1]. The address in video buffer memory 116 for the next logical pixel location in the first logical row is translated from its physical or original linear address of (2), corresponding to native pixel location (H−3, 0), to a linear address of the quantity [(H−4)*(W−1)+1], and so on for the first logical row, reaching linear memory address location (0) for physical or native pixel location (0, 0), which is displayed as the last pixel in the first logical row on rotated display device 114.

The address in video buffer memory 116 for the first pixel of the next logical row is translated from its original linear address of (W) to a linear address of the quantity [(H−2)*(W−1)+2], corresponding to physical or native pixel location (H−1, 1). The next pixel of that second logical row, for which the original linear address in video buffer memory 116 is (W+1), is translated to a linear address of the quantity [(H−2)*(W−1)+3], corresponding to native pixel location (H−1, 2). The process of address translation repeats until the logical last pixel location 138 of display image 112 to be displayed, corresponding to logical position (H−1, W−1), and for which the original linear address in video buffer memory 116 is ((H*W)−1), is translated to a linear address of the quantity [(W−1)].

Once a full scan of display image 112 is completed on display device 114, the address translation and rendering process can repeats for the next display frame. The mapping and rendering process can repeat at the refresh rate set on display device 114, such as 50 Hz, 60 Hz, or other rates or values. It may be noted that the illumination of individual pixels of display image 112 out of their usual order in direction or time, for instance in an altered order of right-to-left in the case of a rotation of 90 degrees clockwise as described, does not necessarily affect perceived image quality, due to refresh rates, anti-aliasing, or other characteristics of display device 114 or supporting driver software, so that for example no flicker is observed.

Figure 5:
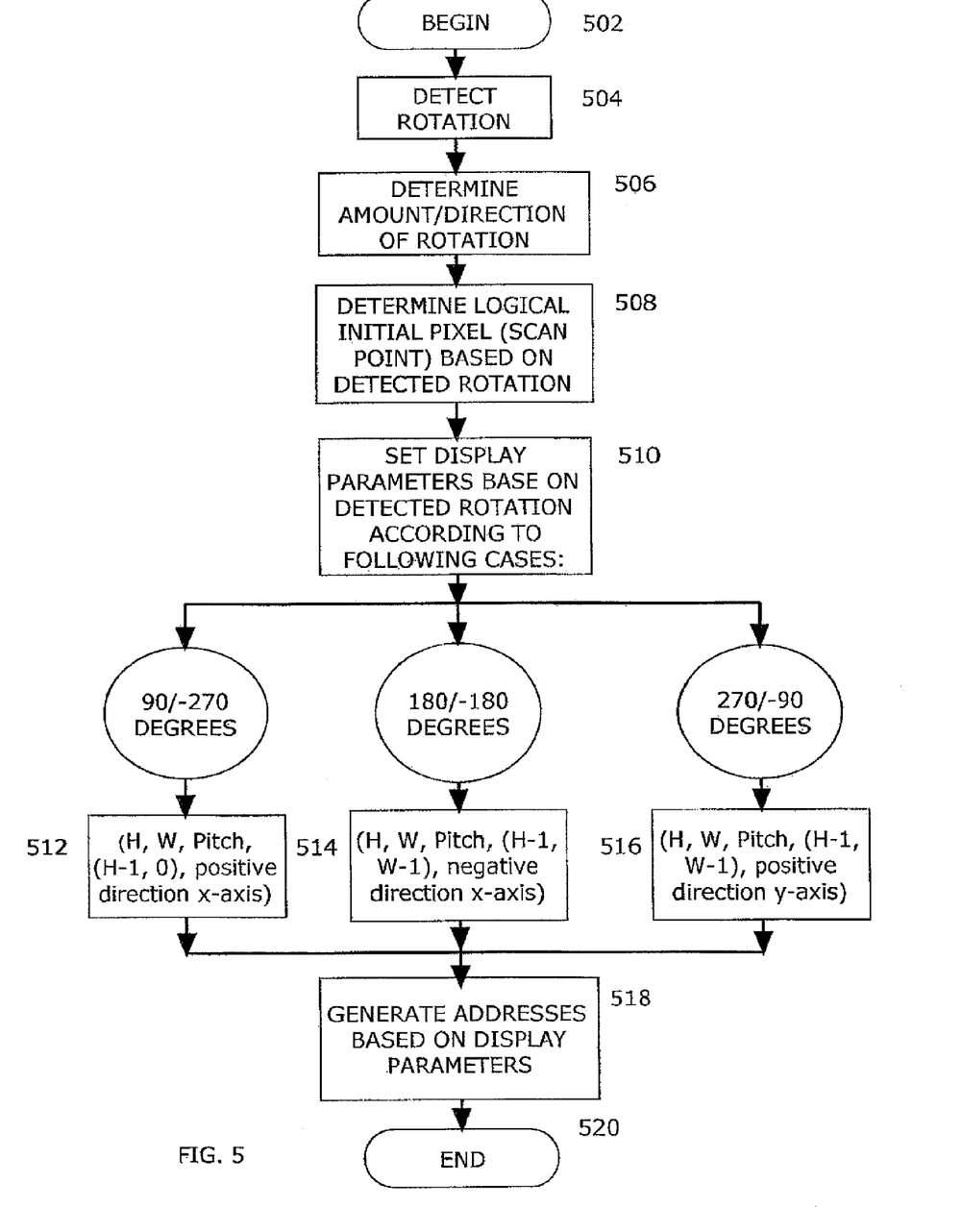
FIG. 5 illustrates a flowchart of logical scan processing including scan order and display parameter generation, according to various embodiments.

FIG. 5 illustrates logical scan processing including scan order and display parameter generation, according to embodiments. In step 502, processing can begin. In step 504, a rotation of display device 114 can be detected. In step 506, the amount and direction of the rotation can be determined by operating system 104 or other logic. In step 508, a logical initial pixel position 132 (that is, the initial scan point) can be determined by operating system 104 or other logic, based on the amount and direction of the rotation.

In step 510, display parameters 140 including (H, W, Pitch, Initial Pixel, Initial Traverse Axis) can be determined or set by operating system 104 or other logic, based on the amount and direction of rotation. Display parameters 140 (H, W, Pitch, Initial Pixel, Initial Traverse Axis) respectively indicate height (in pixels), width (in pixels), pitch (between pixels), the physical location of the new logical initial pixel (0, 0) (that is, the location in the native scan order of display device 114), and the (horizontal or vertical) native axis along which scan lines will now first be traversed, after rotation.

Display parameters 140 can be set according to at least different cases, shown as 512, 514, 516, corresponding to three categories of rotation amount and direction. In cases of rotation by 90 degrees (clockwise) or −270 degrees (counter-clockwise), processing can proceed to step 512, wherein display parameters 140 can be set to (H, W, Pitch, (H−1, 0), positive direction x-axis) can be set. In cases of rotation by 180 degrees (clockwise) or −180 degrees (counterclockwise), processing can proceed to step 514, wherein display parameters 140 can be set to (H, W, Pitch, (H−1, W−1), negative direction x-axis) can be set. In cases of rotation by 270 degrees (clockwise) or −90 degrees (counterclockwise), processing can proceed to step 516, wherein display parameters 140 can be set to (H, W, Pitch, (H−1, W−1), positive direction y-axis) can be set.

After display parameters 140 are set according to the amount and direction of rotation, processing can proceed to step 518, where memory addresses in video buffer memory 116 can be generated according to the display parameters 140. The memory address information can be generated by operating system 104, rotating address generator 120, by operating system 104 in combination with rotating address generator 120, or other logic. The generation of memory addresses can be include the mapping of memory locations from addresses corresponding to native positions on display device 114 to a logical scan order determined by the amount and direction of rotation. In embodiments, memory translation can be done according to methods illustrated in FIG. 6 described below. In step 520, processing can repeat, return to a prior processing point, jump to a further processing point, or end.

Figure 6:
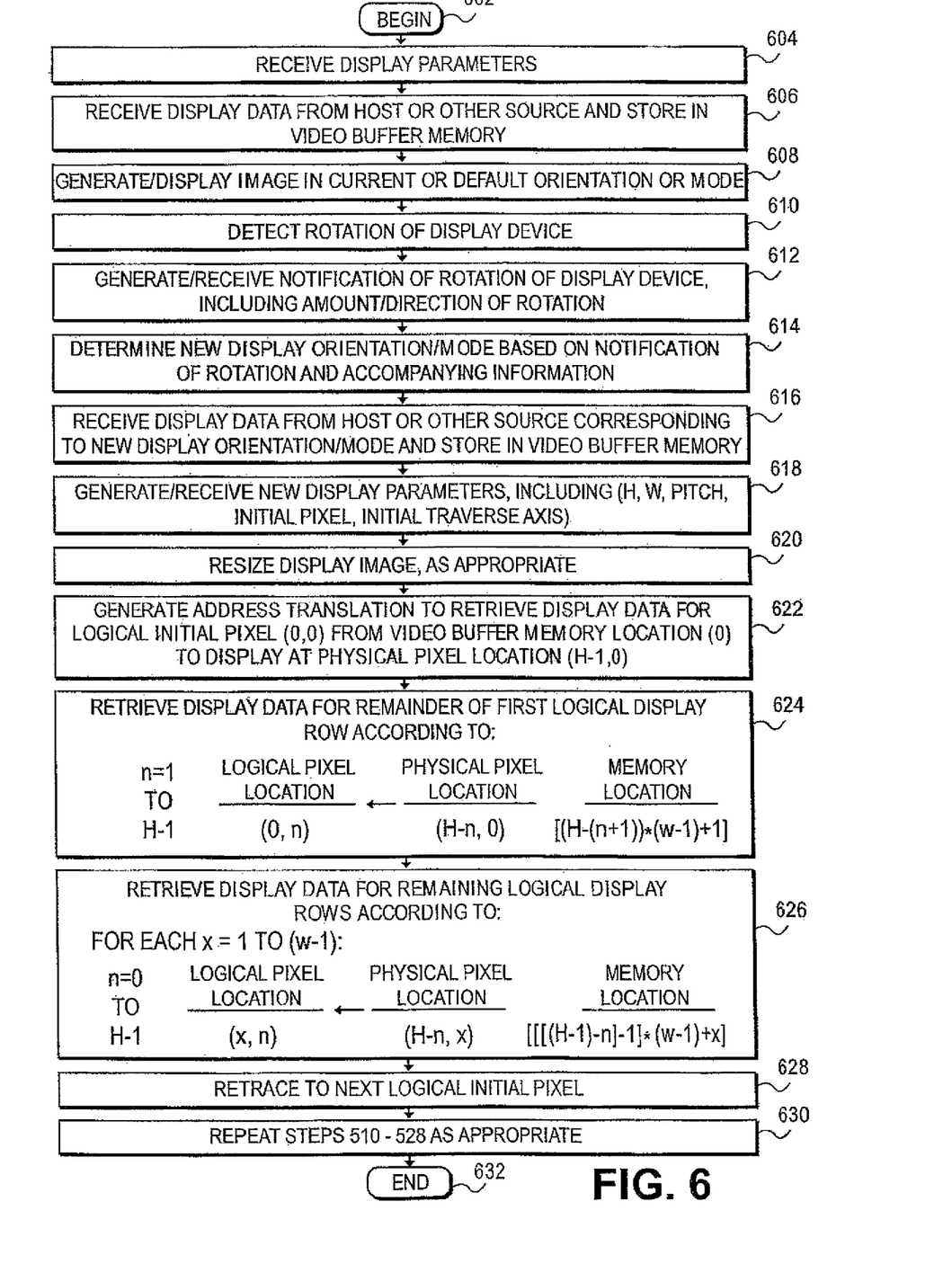
FIG. 6 illustrates a flowchart of overall display processing including video buffer memory address generation, according to various embodiments.

FIG. 6 illustrates display processing including memory translation, according to various embodiments of the invention. In step 602, processing can begin. In step 604, display parameters 140 for the display of display image 112 can be received by or from operating system 104, or other logic. In embodiments display parameters 140 can comprise (H, W, Pitch) parameters for display image 112. In step 606, display data 110 can be received from host 106 or other source, and stored in video buffer memory 116. The display data 110 can comprise, for example, a variety of information encoding pixel display attributes, including 24-bit or 32-bit RGB or other color data, alpha channel data, or other information or display attributes for a given pixel.

In step 608, a display image 112 can be generated on display device 114 based on display data 110 for a default, current, or initial orientation or mode of display device, for example, a landscape mode or other display mode or orientation. In step 610, a rotation of display device 114 can be detected, for example by an internal gyroscope, switch, a hot plug detector in display connector 122, or other detection or sensing. In step 612, a notification of the rotation of display device 114 can be generated or received, for example, by operating system 104, or other logic. The notification can include information regarding the amount and direction of rotation of display device 114, for example 90 degrees clockwise. In step 614, in embodiments an updated display orientation based on the detected rotation of display device 114 can be determined. For example, operating system 104 or window manager 136 can select portrait orientation or mode as an updated display mode, based on a detected rotation of 90 degrees clockwise. It may be noted that in embodiments, display processing to maintain desired image orientation can proceed without necessarily attempting to change the display mode. In step 616, display parameters 140 for display image 112 can be generated or received by operating system 104 or other logic. In embodiments, display parameters 140 can include (H, W, Pitch, Initial Pixel, Initial Traverse Axis), to generate display image on rotated display device 114.

In step 618, display data 110 can be received from host 106 or other source corresponding to the updated display orientation or mode presented on rotated display device 114, and stored to video buffer memory 116. In step 620, the display image 112 can be resized by operating system 104 or other logic. Display image 112 can be resized, for example, to maintain a desired aspect ratio. Other manipulations or corrections of display image 112 on rotated display device 114 are possible.

In step 622, an address translation can be generated to retrieve a logical initial pixel location 132 from video buffer memory 116, based on display parameters 140 and detected rotation of display device 114. In the case of a rotation by 90 degrees clockwise, for example, the display data 110 for logical initial pixel location (0, 0) can be retrieved from a memory location 128 of (0) in video buffer memory 116, and mapped to a physical display location of (H−1, 0). This mapping takes the default or original initial pixel location 126 from the upper-left corner (when viewed before rotation) of display device 114 to the lower-left corner (when viewed before rotation), so that the net result is that logical initial pixel location 132 at (0, 0) in rotated coordinates appears in the upper-left corner. In embodiments, the address mapping or translation between the logical pixel location being displayed and the address of source display data 110 corresponding to a physical or native pixel location can be performed by rotating address generator 120. In embodiments, that address mapping or translation can be performed by operating system 104, by rotating address generator 120 in combination with operating system 104, or by other logic.

After the display data 110 for logical initial pixel location 132 (0, 0) is retrieved from video display memory 116 and rendered by display circuitry 118 to display device 114 at displayed native pixel location (H−1, 0), in step 624 the display data 110 for the remainder of the pixels in the first logical pixel row being displayed can be retrieved by the following mapping or transform:

Equation 1

| | Logical Pixel Location | Native pixel Location | Memory Location (linear address) |
|---|---|---|---|
| $n = 1$ to $H-1$ | $(0, n)$ | $(H-n, 0)$ | $[(H-(n+1))^*(W-1)+1]$ |

Upon completion of rendering the first logical row of display image 112 under rotation, in step 626 display processing can repeat for the remainder of the rows of a complete from of display image 112, according to the following mapping or transform:

Equation 2

| | Logical Pixel Location | Native pixel Location | Memory Location (linear address) |
|---|---|---|---|
| $n = 0$ to $H-1$ | $(x, n)$ | $(H-n, x)$ | $[[[H-(n+1)]-1](W-1)+x^*]$ |

After address translation and display of an entire page or frame of pixels in their logical positions compensating for the rotation, in step 628, processing can proceed to a new logical initial pixel location 132 at logical pixel location (0, 0) on rotated display device 114, to begin a new or refreshed display image 112. In step 630, processing can repeat from step 610 to detect any further rotation of display device 114 through step 628 or another processing point, until all desired display data 110 are mapped and displayed. In step 632 processing can repeat, return to a prior processing point, jump to a further processing point, or end. For example, display mapping as described can terminate when a user rotates display device 114 to return to a default or prior orientation, and rotational mapping is no longer required.

It will be appreciated that while an illustrative rotation of display device 114 and corresponding memory mappings have been described with respect to a clockwise rotation of 90 degrees, compensation and address regeneration can be performed according to techniques described for rotations of 180 degrees, 270 degrees, or other amounts of rotation, in either clockwise or counterclockwise directions. In embodiments, address translation into video buffer memory 116 can be altered to account for different initial pixel locations and initial traverse direction data reported in display parameters 140.

Figure 7:
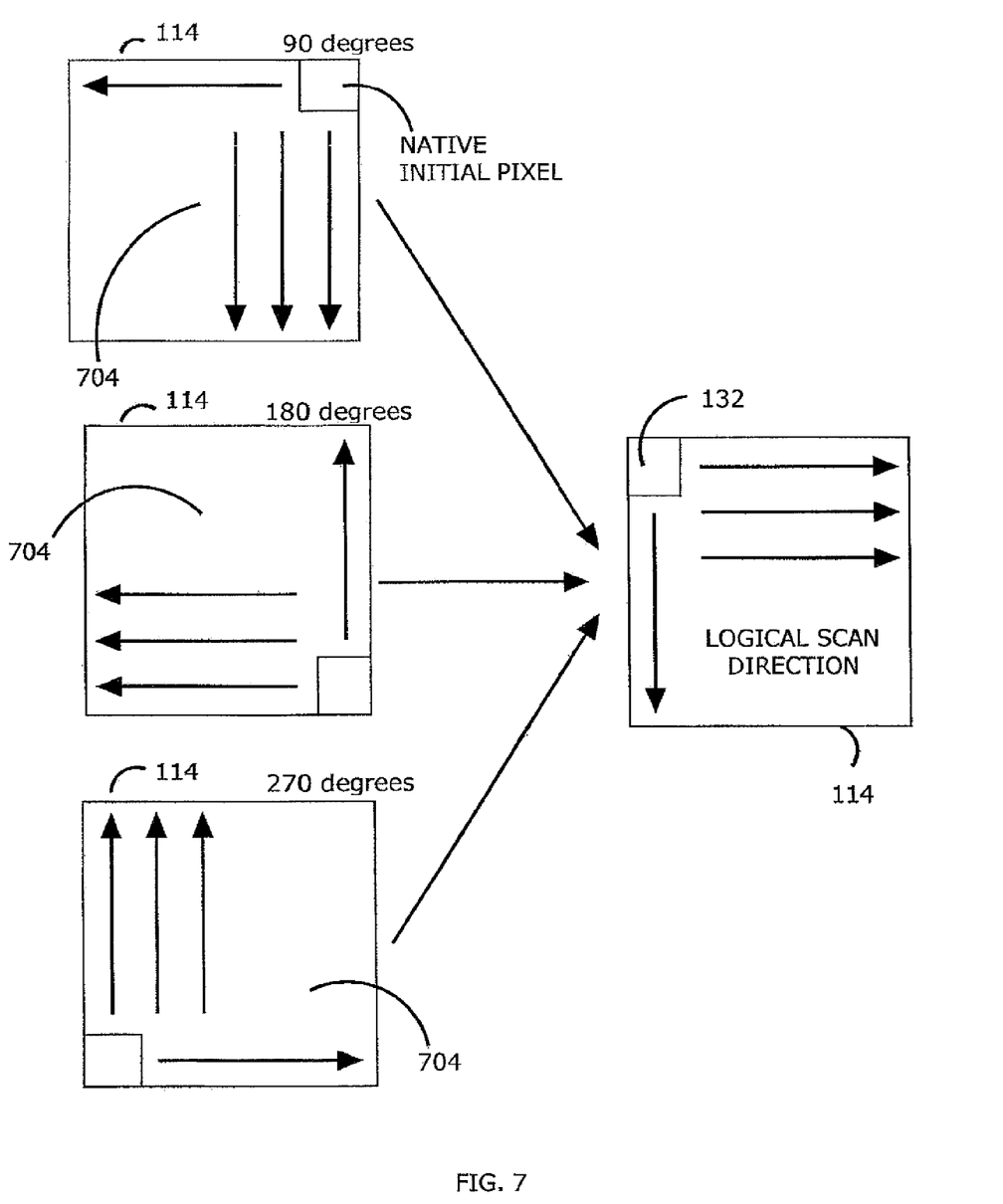
FIG. 7 illustrates a flowchart of logical scan processing including native and logical scan orders, according to various embodiments.

As illustrated in FIG. 7, for example, a native scan direction 704 and the initial pixel location of display device 114 can be mapped or translated into a logical initial pixel location 132, along with logical scan directions and corresponding memory translations for different amounts and directions of rotation. Those amounts and directions of rotation can include at least cases of rotation by 90 degrees clockwise (or −270 degrees counterclockwise) as described above, by 180 degrees clockwise (or −180 counterclockwise), and by 270 degrees clockwise (or −90 degrees counterclockwise). When a rotation of display device 114 of 180 degrees clockwise (or −180 degrees counterclockwise) is detected, the location of the logical initial pixel location 132 (at logical 0, 0 after rotation) can be determined to be at physical pixel location (H−1, W−1) after rotation, and the mappings described above can be altered to place that pixel in the upper-left corner of display device 114. In this case initial traverse axis extends rightward in the horizontal or positive x-direction. When a rotation of display device 114 of 270 degrees clockwise (or −90 degrees counterclockwise) is detected, for example, the location of the logical initial pixel location 132 can be determined to be at physical pixel location (H−1, 0) after rotation, and the mappings described above can be altered to place that pixel in the upper-left corner of display device 114. In this case the initial traverse axis extends upward in the vertical or positive y-direction. Mappings for other rotation amounts and directions can be computed with corresponding adjustments in the initial pixel location and initial traverse axis.

The foregoing description is illustrative, and variations in configuration and implementation may occur to persons skilled in the art. For example, while the invention has generally been described in terms of detected a planar rotation of display device 114, in embodiments the detection of an incline from the vertical, or other two-dimensional or three-dimensional changes in position, can be detected and compensated for. While the invention has been described in embodiments as implemented on a computer driving a computer monitor or display screen, it will be appreciated that the invention can be implemented in other display devices and systems, for example, in portable audio or video players having a display screen, in video cameras having a display screen, or in cellular telephones, digital cameras, or other devices.

Further, while the invention has been generally described in terms of a display image 112 comprising a single displayed document, photograph or other image, in embodiments the automatic mapping to maintain a desired orientation can include mapping multiple adjacent, overlapping, partially overlapping, stacked, or other windows, images, or other display objects contained in the display image 112 shown by display device 114. While the invention has likewise been generally described as involving an initial pixel location of display device 114 and/or display image 112 that is by convention located at the upper-left corner at designated row and column position (0, 0), in embodiments the initial pixel location can be a different native pixel location, and/or the display coordinates for the initial pixel position can be a different designated (X, Y) pair. Further again, while embodiments of the invention have been described in terms of a video buffer memory 116 that stores a display frame in linear order, in embodiments video buffer memory 116 can be configured in a two-dimensional or other arrangement, rather than in a linear arrangement.

Similarly, while embodiments have generally been described in terms of display data 110 being stored to, and retrieved from, video buffer memory 116, in embodiments the display data 110 can be stored to, and retrieved from, other types of memory or memory in other locations of a computer or other system. In embodiments, moreover, automatic mapping and compensation for rotation can be applied to more than one display device 114 at the same time or connected to the same host 106. Other resources described as singular or integrated can in embodiments be plural or distributed, and resources described as multiple or distributed can in embodiments be combined. The scope of the invention is accordingly intended to be limited only by the following claims.

What is claimed is:

1. A method, comprising:
receiving display data to generate a display image on a display device;
storing the display data in a single video buffer according to native pixel locations as physically displayed on the display device in a first orientation, wherein the stored display data only includes the display image in the first orientation and does not include the display image in a second orientation that is different from the first orientation;
determining, relative to a native scan pattern of the display device and in view of a determination that a notification of a rotation of the display device is received, a logical initial pixel of the display image;
generating, by a processor and in view of a location of the logical initial pixel and the determination that the notification of the rotation of the display device is received, an adjusted read-out order of a first logical pixel row of the display data from the single video buffer, the adjusted read-out order of the first logical pixel row comprising a logical scan direction to display pixels of the display image in the second orientation instead of according to the native pixel locations in view of the display data stored in the single video buffer and the notification of the rotation, wherein the stored display data only includes the display image in the first orientation and does not include the display image in the second orientation when the logical scan direction is generated after receiving the notification of the rotation of the display device;
resizing the display data in view of an aspect ratio of the display data and the second orientation;
outputting, beginning from the location of the logical initial pixel as translated in relation to the rotation of the display device, the first logical pixel row of the display data, as resized, from the single video buffer to the display device, the first logical pixel row being output according to the logical scan direction to display pixels of the display image in the second orientation; and
subsequent to a determination that the first logical pixel row of the display data is illuminated on the display device,
generating, in view of the location of the logical initial pixel and the determination that the notification of the rotation of the display device is received, an adjusted read-out order of a second logical pixel row of the display data from the single video buffer, and
outputting the second logical pixel row of the display data, as resized, from the single video buffer to the display device according to the logical scan direction to display pixels of the display image in the second orientation.

2. The method of claim 1, wherein the logical initial pixel comprises a corner pixel of the display image.

3. The method of claim 1, wherein the generating the adjusted read-out order comprises iteratively generating a next logical pixel adjacent to the current pixel, until an edge of the display device is reached.

4. The method of claim 3, wherein the generating the adjusted read-out order comprises advancing to a new row or column of the display image when the edge of the display device is reached.

5. The method of claim 1, wherein the rotation of the display device comprises rotation by an integer multiple of 90 degrees.

6. The method of claim 1, wherein the display image is displayed in a display mode comprising at least one of a landscape mode or a portrait mode.

7. The method of claim 1, wherein the second orientation comprises a vertical orientation.

8. The method of claim 1, wherein the generating the adjusted read-out order comprises generating a set of display parameters comprising at least one of: display height information, display width information, pixel dot pitch information, logical initial pixel information, or initial traverse axis information.

9. The method of claim 1, wherein the generating the adjusted read-out order comprises generating an address of video buffer memory corresponding to a current logical pixel.

10. The method of claim 9, wherein the address of video buffer memory is generated by an address generator communicating with video display circuitry.

11. A system, comprising:
a single video buffer memory to receive display data to generate a display image on a display device, wherein the display data is stored in the single video buffer memory according to native pixel locations as physically displayed on the display device in a first orientation, wherein the stored display data only includes the display image in the first orientation and does not include the display image in a second orientation that is different from the first orientation; and
a processor, operatively coupled to the single video buffer memory, to:
determine, relative to a native scan pattern of the display device and in view of a determination that a notification of a rotation of the display device is received, a logical initial pixel of the display image;
generate, in view of a location of the logical initial pixel and the determination that the notification of the rotation of the display device is received, an adjusted read-out order of a first logical pixel row of the display data from the single video buffer memory, the adjusted read-out order of the first logical pixel row comprising a logical scan direction of the display image in the second orientation instead of according to the native pixel locations in view the display data from the single video buffer memory to display the display image in the second orientation instead of according to the native pixel locations, wherein the stored display data only includes the display image in the first orientation and does not include the display image in the second orientation when the logical scan direction is generated after the notification of the rotation of the display device is received;
resize the display data in view of an aspect ratio of the display data and the second orientation;
output, beginning from the location of the logical initial pixel as translated in relation to the rotation of the display device, the first logical pixel row of the display data, as resized, from the single video buffer to the display device, the first logical pixel row being output according to the logical scan direction to display pixels of the display image in the second orientation; and
subsequent to a determination that the first logical pixel row of the display data is illuminated on the display device,
generate, in view of the location of the logical initial pixel and the determination that the notification of the rotation of the display device is received, an adjusted read-out order of a second logical pixel row of the display data from the single video buffer, and
output the second logical pixel row of the display data, as resized, from the single video buffer to the display device according to the logical scan direction to display pixels of the display image in the second orientation.

12. The system of claim 11, wherein the logical initial pixel comprises a corner pixel of the display image.

13. The system of claim 11, wherein the processor is to iteratively generate a next logical pixel adjacent to the current pixel, until an edge of the display device is reached.

14. The system of claim 13, wherein the address generator generates an address to advance to a new row or column of the display image when the edge of the display device is reached.

15. The system of claim 11, wherein the rotation of the display device comprises rotation by an integer multiple of 90 degrees.

16. The system of claim 11, wherein the display image is displayed in a display mode comprising at least one of a landscape mode or a portrait mode.

17. The system of claim 11, wherein the second orientation comprises a vertical orientation.

18. The system of claim 11, wherein the logical scan direction is in view of a set of display parameters comprising at least display height information, display width information, pixel dot pitch information, logical initial pixel information, or initial traverse axis information.

19. The system of claim 11, wherein the display device is selected from the group consisting of a liquid crystal display, a cathode ray tube display, a plasma display, a display integrated in a portable media device, or a video display device.

20. A non-transitory computer-readable medium having instructions encoded thereon which when executed by a processor cause the processor to:
receive display data to generate a display image on a display device;
store the display data in a single video buffer according to native pixel locations as physically displayed on the display device in a first orientation, wherein the stored display data only includes the display image in the first orientation and does not include the display image in a second orientation that is different from the first orientation;
determine, relative to a native scan pattern of the display device and in view of a determination that a notification of a rotation of the display device is received, a logical initial pixel of the display image;
generate, by the processor and in view of a location of the logical initial pixel and the determination that the notification of the rotation of the display device is received, an adjusted read-out order of a first logical pixel row of the display data from the single video buffer, the adjusted read-out order of the first logical pixel row comprising a logical scan direction to display pixels of the display image in the second orientation instead of according to the native pixel locations in view of the display data stored in the single video buffer and the notification of the rotation, wherein the stored display data only includes the display image in the first orientation and does not include the display image in the second orientation when the logical scan direction is generated after receiving the notification of the rotation of the display device;
resize the display data in view of an aspect ratio of the display data and the second orientation;
output, beginning from the location of the logical initial pixel as translated in relation to the rotation of the display device, the first logical pixel row of the display data, as resized, from the single video buffer to the display device, the first logical pixel row being output according to the logical scan direction to display pixels of the display image in the second orientation; and subsequent to a determination that the first logical pixel row of the display data is illuminated on the display device, generate, in view of the location of the logical initial pixel and the determination that the notification of the rotation of the display device is received, an adjusted read-out order of a second logical pixel row of the display data from the single video buffer, and output the second logical pixel row of the display data, as resized, from the single video buffer to the display device according to the logical scan direction to display pixels of the display image in the second orientation.

21. The non-transitory computer-readable medium of claim 20, wherein the logical initial pixel comprises a corner pixel of the display image.

22. The method of claim 1, further comprising generating rotational information by a sensor in the display device.

* * * * *